United States Patent [19]

Munoz et al.

[11] 4,333,678
[45] Jun. 8, 1982

[54] TRUCK BED LINER ASSEMBLY

[75] Inventors: Donald L. Munoz, Warren; Daniel A. Grote, Algonac; David G. Bronder, Rochester, all of Mich.; Gerald J. Weis, Dallas, Tex.

[73] Assignee: Thermoplastics Incorporated, Prairie View, Tex.

[21] Appl. No.: 66,096

[22] Filed: Aug. 13, 1979

[51] Int. Cl.³ .............................................. B62D 33/00
[52] U.S. Cl. .................................... 296/39 R; 220/4 F
[58] Field of Search ........................... 296/39 R, 39 A; 220/470, 4 R, 4 F, 468

[56] References Cited
U.S. PATENT DOCUMENTS 3,993,211 11/1976 Astle ..................................... 220/4 F
4,111,481 9/1979 Nix et al. ............................. 296/39 R
4,162,098 7/1979 Richardson ........................ 296/39 R Primary Examiner—Robert R. Song
Attorney, Agent, or Firm—Wallenstein, Spangenberg, Hattis & Strampel

[57] ABSTRACT

A knockdown bed liner assembly for pickup-type trucks comprising interconnectable floor, side and front panels, and a separate tailgate panel. The floor and side panels are shaped to accommodate the wheel wells of a truck, and the floor panel is provided with a unique rib construction to facilitate movement of cargo on the panel and to permit air circulation between the floor panel and the truck bed floor to protect against condensation and rust. The panels are packaged and shipped in knockdown form in a relatively compact easy-to-handle container ready for assembly at the point of use.

11 Claims, 15 Drawing Figures

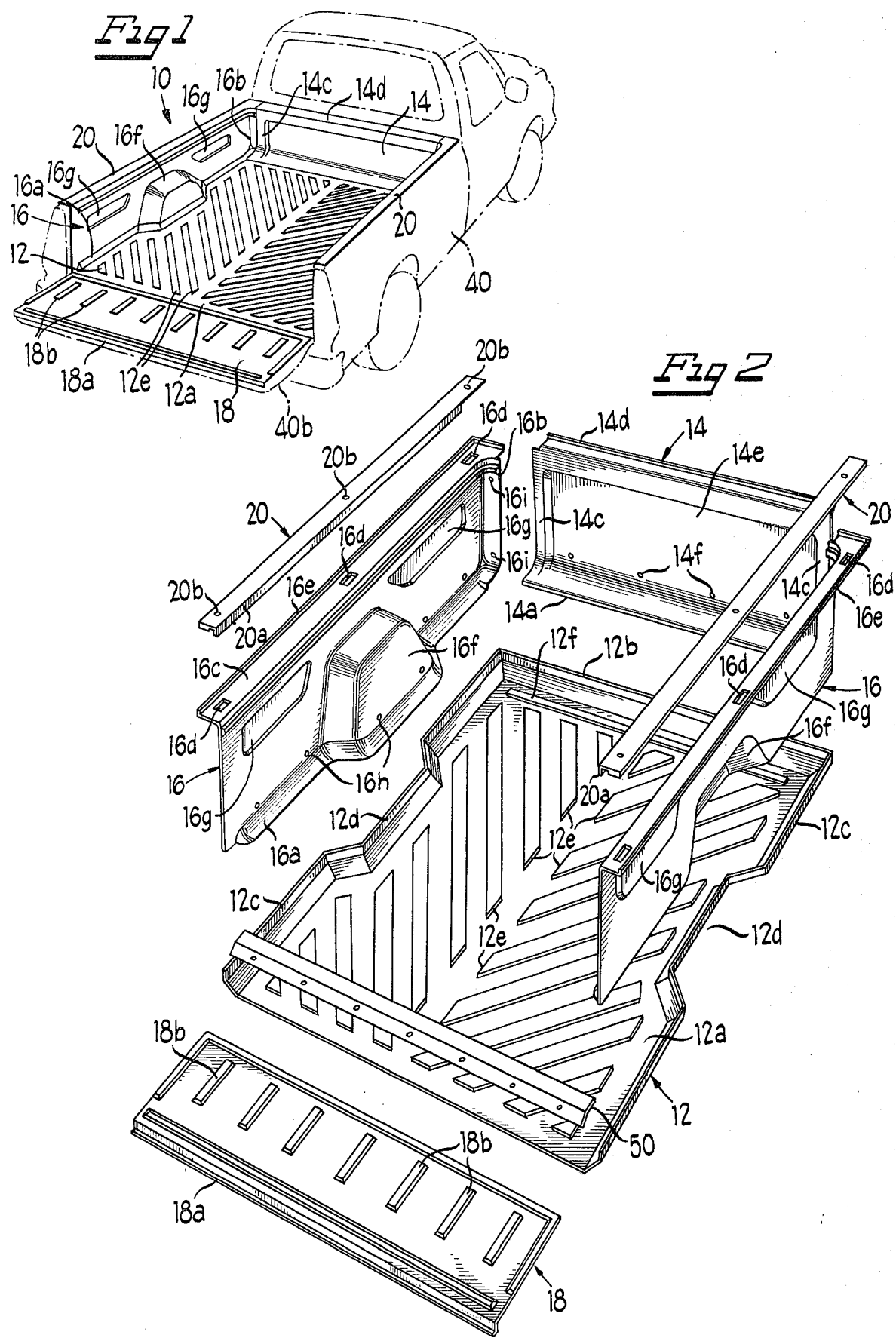

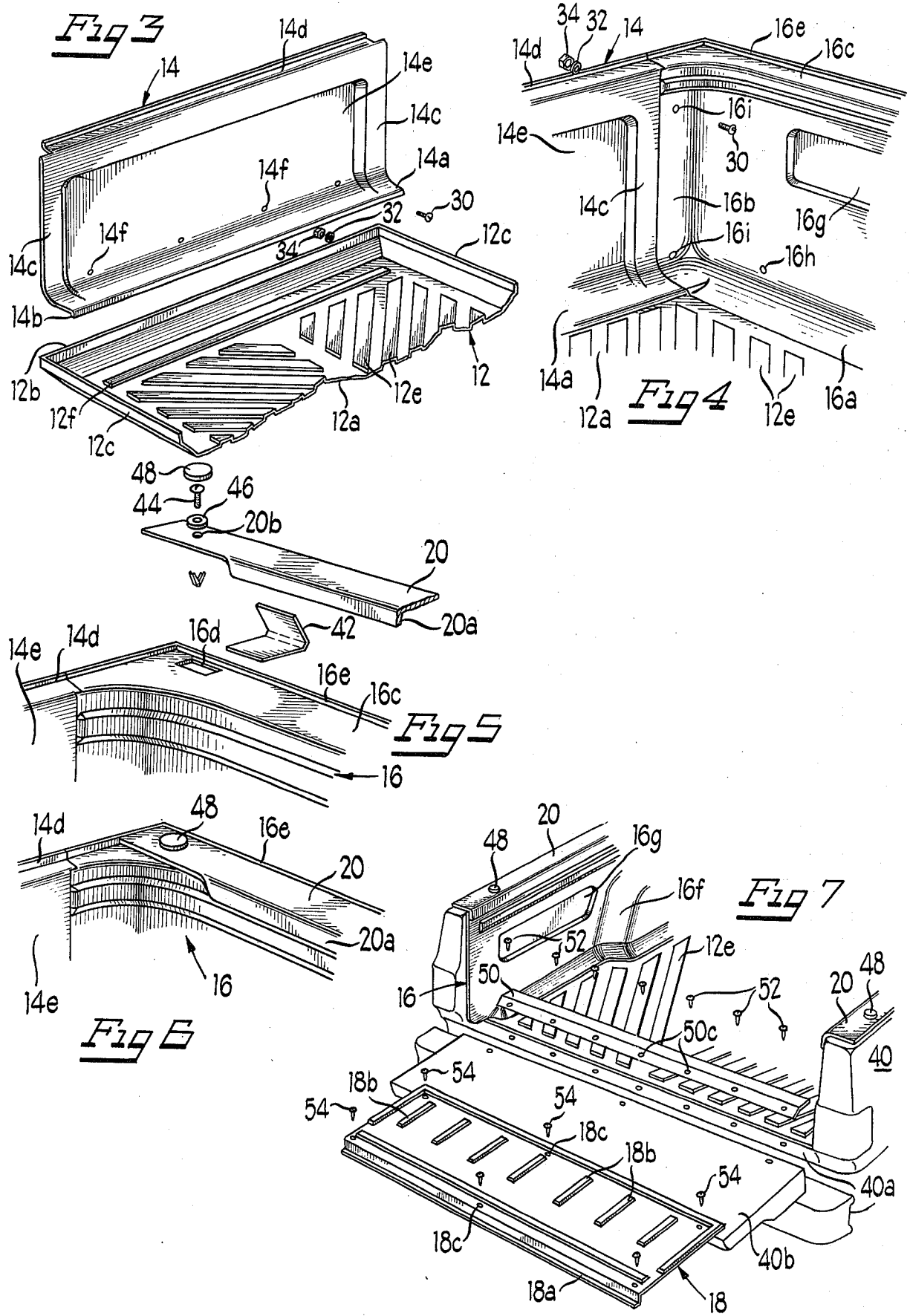

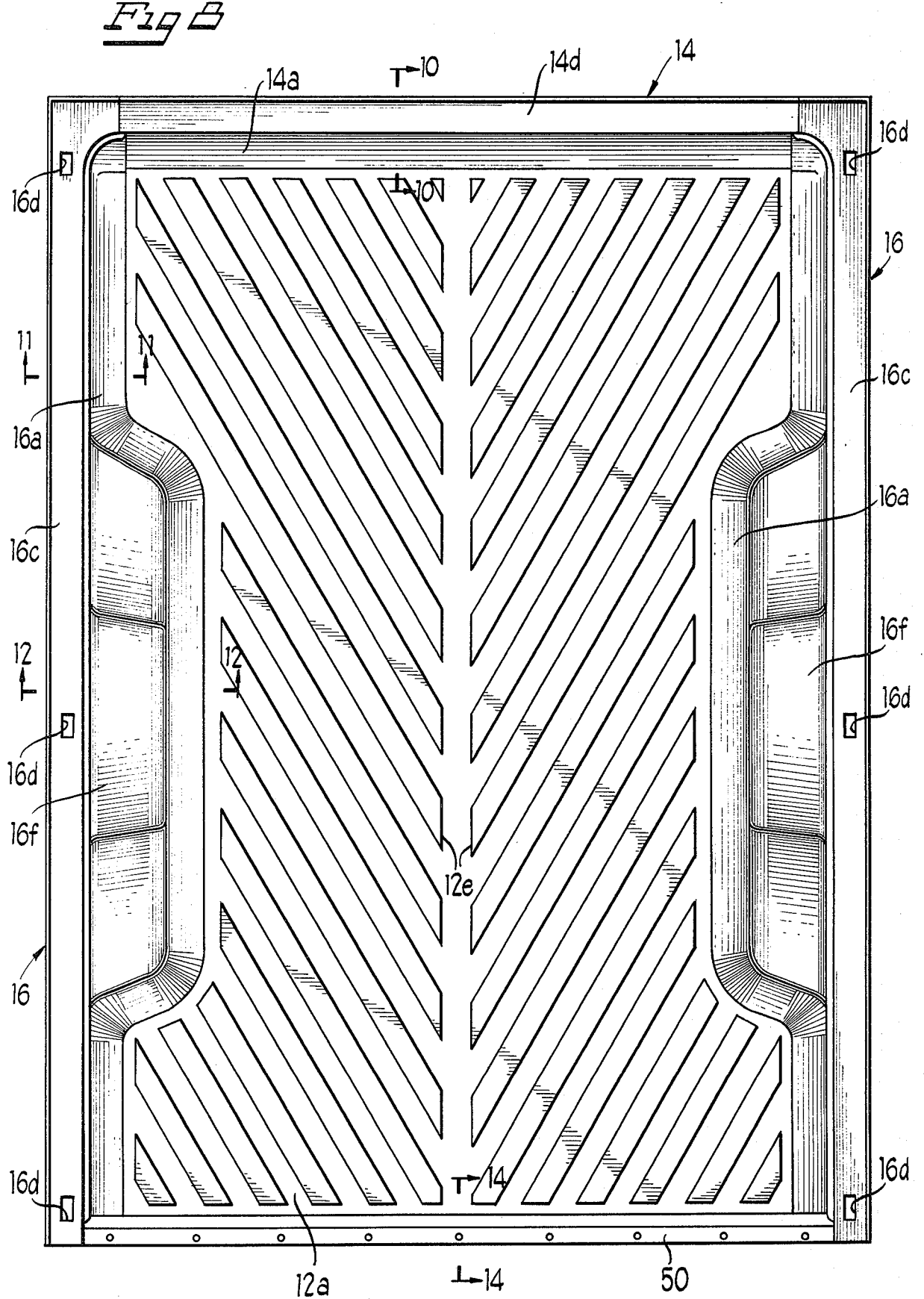

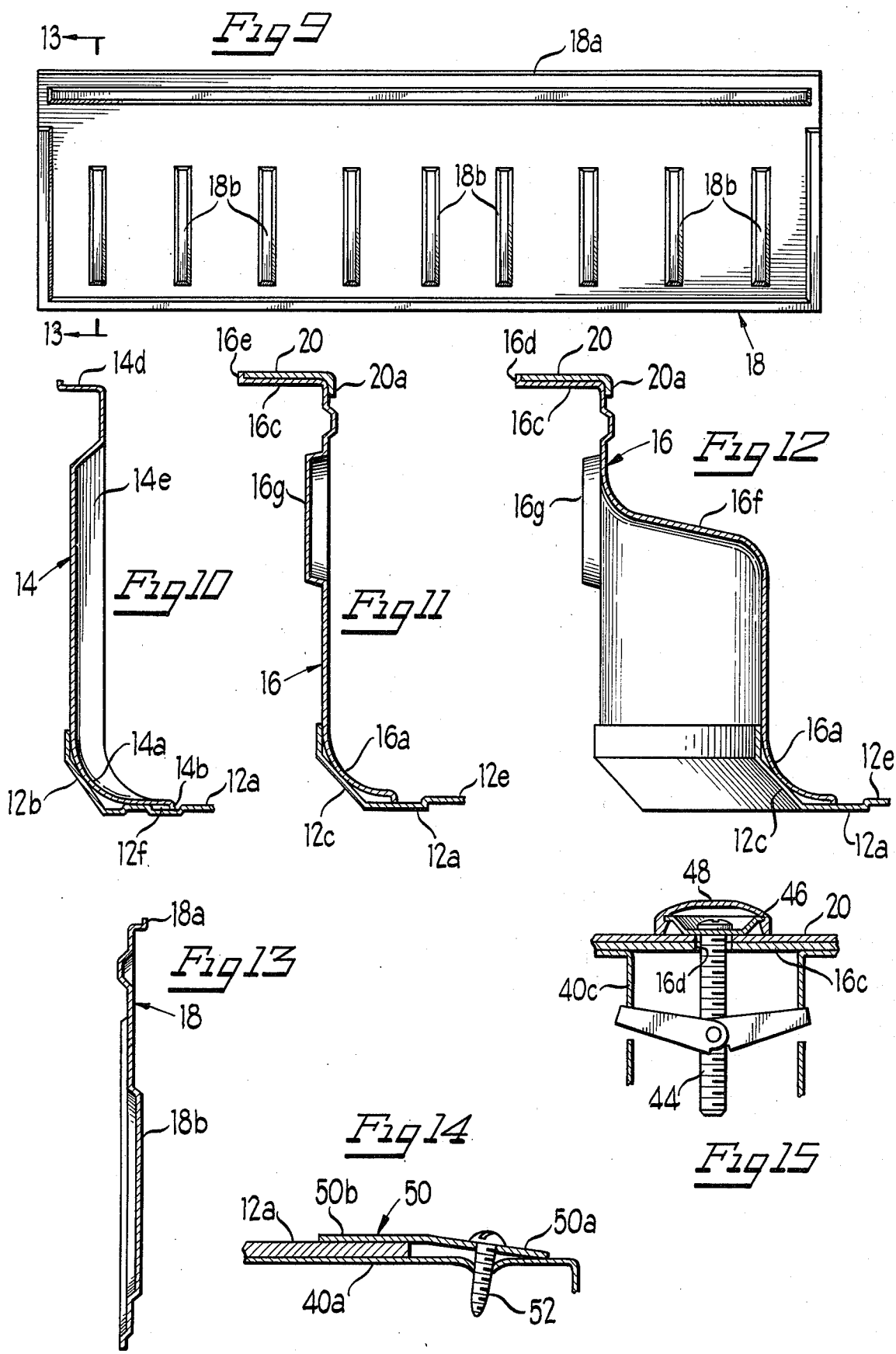

TRUCK BED LINER ASSEMBLY

The present invention relates to a protective liner for the bed of a pickup-type truck, and, in particular, to a protective liner adapted to be assembled at the point of use.

Heretofore, it has been suggested to utilize a molded one-piece liner for protecting the bed of a pickup truck. Specific embodiments of such one-piece liners are disclosed, for example, in U.S. Pat. Nos. 3,881,768 and 4,047,749. Liners of this type have significant economic disadvantages, especially from the standpoint of the manufacturer, in that large, usually intricate, high-cost molds are required to form the liners. In addition, the finished products must be packaged and shipped in containers large enough to encase the liner. Such containers not only represent an appreciable manufacturing cost, but, also, due to their comparatively large size and cumbersomeness, substantially increase handling and shipping costs. These costs, of course, are passed on to the purchasers of the liners.

In accordance with the present invention, a truck bed liner assembly has been evolved which comprises a small number of preformed parts adapted to be assembled at the point of use. The parts are light in weight and are of a size such that they can be packaged in a relatively compact, easily handled container. Wholly apart from the significant savings in manufacturing and shipping costs attained with the liner assembly of this invention, the assembly has a number of built-in structural features which make it functionally superior to other pickup truck bed liners.

The liner assembly, in brief, comprises a floor panel for the truck bed floor, a front panel for the front wall of the truck bed, and a pair of side panels for the side walls of the truck bed. The floor, front and side panels are interconnectable with fastening means included with the assembly and where these panels are interconnected, double thicknesses are provided to add strength and rigidity to the assembly. These panels, which are preferably vacuum molded from thermoplastic sheets, all have uniform and even wall thickness so that when they are interconnected into the liner assembly, differences in expansion and contraction of the panels due to temperature variations and warping of the liner assembly are minimized, an advantage which cannot be achieved in one-piece liners. A separate panel is provided for the tailgate of the truck.

The floor panel is formed with a plurality of inwardly extending, diagonally arranged offset ribs which serve to permit air circulation between the floor panel and the truck bed floor to reduce condensation and rust. The ribs also act to facilitate movement of cargo on the floor panel. The floor panel and the side panels are preformed to accommodate the wheel wells of a truck, and the side panels may be provided with stake pocket openings through which the assembled liner may be rigidly secured to the stake pockets of the bed of the truck. The liner assembly fits many different makes of trucks, for example, 8 foot bed trucks of Chevrolet, Ford, Dodge and GMC. A rear molding strip for the floor panel, and rail guards for the side panels advantageously are included in the assembly to provide a liner which is both structurally sound and highly attractive in appearance.

The foregoing, and other advantages and features of the protective liner assembly will become apparent from the following description taken in conjunction with the accompanying drawings wherein:

FIG. 1 is a view in perspective showing an embodiment of the protective liner assembly of the present invention installed in the bed of a pickup truck;

FIG. 2 is an exploded view in perspective of the components of said embodiment of the liner assembly;

FIG. 3 is a fragmentary view in perspective illustrating the manner in which the front panel and the floor panel of the assembly are interconnected;

FIG. 4 is a fragmentary view in perspective showing the position of one of the side panels to the front panel of the assembly prior to being interconnected;

FIG. 5 is a fragmentary exploded view in perspective showing the manner in which the rail guards of the assembly are secured in position on the top flange of the side panels through the stake pockets;

FIG. 6 is a fragmentary view in perspective corresponding to the view of FIG. 5 showing the rail guard secured to the side panel;

FIG. 7 is fragmentary view in perspective showing the manner in which the molding strip for the floor panel and the tailgate panel of the assembly are secured in position;

FIG. 8 is a plan view of the assembled floor panel, front panel and side panels of said embodiment of the assembly;

FIG. 9 is a plan view of the tailgate panel of said embodiment of the panel;

FIG. 10 is a sectional view taken substantially along line 10—10 of FIG. 8;

FIG. 11 is a sectional view taken substantially along line 11—11 of FIG. 8;

FIG. 12 is a sectional view taken substantially along line 12—12 of FIG. 8;

FIG. 13 is a sectional view taken substantially along line 13—13 of FIG. 9;

FIG. 14 is a sectional view taken substantially along line 14—14 of FIG. 8; and

FIG. 15 is an enlarged fragmentary view partly in section showing a rail guard secured on the side panel through a stake pocket in the truck bed side wall by means of a toggle bolt.

As best shown in FIG. 2 of the drawings, the embodiment of the protective liner assembly illustrated, and designated generally by reference numeral 10, comprises a floor panel 12, a front panel 14, a pair of side panels 16—16, and a tailgate panel 18. A pair of rail guards 20—20 are provided for securing the side panels 16—16 to the side walls of the bed of a truck. The panels and the rail guards desirably are formed, as by, respectively, vacuum molding and extrusion molding, from a plastics, hard rubber or rubber-like, or fiberglass, or the like, material. Preferred materials are thermoplastic resins exemplified by polyethylene, polypropylene, ABS polymers, high-impact polystyrene, and acrylics, to name a few. These resins are characterized in that they are impact and shock resistant, and are inert with respect to most chemicals, paints, solvents, gasoline, oil, battery acids, and other corrosive agents. An especially preferred thermoplastic resin material is a high density polyethylene which has been compounded with an ultraviolet light barrier, such as a hydroxybenzophenone or a derivative thereof, to protect the liner against the sun's rays.

The floor panel 12, as shown, has a main body portion 12a provided along its forwardmost margin with an integral upwardly extending front flange 12b, and along its side margins with integral upwardly extending side flanges 12c—12c. The flanges 12c—12c are each provided with a wheel well accommodating recess 12d, and are joined at their forward ends to the ends of the front flange 12b to form a continuous upwardly extending flanges on three sides of the panel 12. Situated on each side of the center line of the main body portion 12a of the panel 12 are a plurality of diagonally arranged, inwardly extending offset ribs 12e formed in the body portion 12a. The ribs 12e permit air circulation between the main body portion 12a of the panel 12 and the truck bed floor thereby reducing the possibility for rust-causing condensation being entrapped therebetween. The forward end of the main body portion 12a of the panel 12, inwardly of the base of the front flange 12b, is provided with a transverse, upwardly offset portion 12f, the purpose of which will become clear as the description proceeds.

The front panel 14 has a lower, inwardly curved flange 14a, the outer edge of which is provided with a downwardly extending lip 14b (see FIG. 10). The front panel 14 also has portions which appear as inwardly extending side flanges 14c—14c, and an upper, outwardly extending flange 14d adapted to overlie the top of the front wall of a truck bed. The main body portion 14e of the front panel 14 advantageously is outwardly offset to add rigidity and strength to the panel 14. A plurality of spaced openings or holes 14f are provided in the front panel 14 for receiving fastening means for securing the front panel 14 to the front flange 12b of the floor panel 12 as will be described below.

The side panels 16—16 of the assembly 10 each have an inwardly curved lower flange 16a, an inwardly extending substantially vertical, front panel engaging end flange 16b, and an upper, outwardly extending flange 16c adapted to overlie the top of the side walls comprising the bed of a truck. The upper flange 16c may be formed with spaced stake pocket openings 16d, which are in alignment with the stake openings 40c in the truck bed side walls, and has an inwardly extending, rail guard engaging lip 16e. The side panels 16—16 are further each provided with an inwardly extending recessed or offset portion 16f for accommodating the wheel wells formed in the side walls of a truck bed. Outwardly extending offset portions 16g—16g advantageously are provided for the side panels 16—16 to add rigidity and strength to the panels. A plurality of horizontally spaced openings or holes 16h are formed in the side panels 16—16 just above the upper extremity of the inwardly curved lower flange 16a of the panels, and vertically spaced openings or holes 16a are provided in the end flanges 16b, for receiving fastening means for securing the side panels 16—16 to the side flanges 12c—12c of the floor panel 12 and to the side flanges 14c—14c of the front panel 14 as will be described hereinafter.

The rail guard 20—20 are adapted to overlie the upper outwardly extending flange 16c of the side panels 16—16. In this position, the outer edge of the guards 20—20 abut the upwardly extending lip 16e formed at the outer margin of the upper flanges 16c—16c of the side panels 16—16. Each guard 20-20 is provided with a downwardly extending lip 20a at its inner margin which is adapted to abut the inner surface of the side panels 16—16 (see FIGS. 11 and 12).

The tailgate panel 18 has an upper, outwardly extending flange 18a adapted to overlie the top of the tailgate of a truck. A plurality of spaced, substantially parallel, outwardly extending offset ribs 18b are formed in the panel 18 to give it added rigidity and strength.

To assemble the liner 10, the floor panel 12 is first placed on a flat surface. The lower flange 14a of the front panel 14 is then placed in overlying relation to the front flange 12b of the floor panel behind the upwardly offset portion 12f (see FIG. 10), and centered with respect thereto. Using the holes 14f in the front panel 14 as guides, holes are drilled through the front flange 12b. The front panel 14 is then secured to the front flange 12b of the floor panel 12 by means of fastening means such as bolts 30, washers 32 and lock nuts 34 (see FIG. 3). The right and left side panels 16—16 are next, sequentially positioned on the floor panel 12 with the lower flange 16a of a panel 16 overlying the side flange 12c of the floor panel 12, and with the end flange 16b overlying the side flange 14c of the front panel 14 (see FIG. 4). The front panel 14 and each side panel 16 should be aligned at the same height. Using the upper hole 16 in the end flange 16b of the panel 16 as a guide, a hole is drilled through the side flange 14c of the front panel 14, and the panels 14 and 16 are interconnected by means of bolts 30, washers 32 and lock nuts (see FIG. 4). The same procedure is followed for each of the holes 16a in the end flanges 16b—16b. The panels 16—16 are each then secured to the side flanges 12c—12c of the floor panel 12 using the holes 16h in the panels 16—16 as guides to drill holes in the flanges 12c—12c, and bolts 30, washers 32 and lock nuts 34 as fastening means.

The bottom, front and side panels and their flanges overlap each other where the panels are secured together to provide double thicknesses at these points to add strength and rigidity to the assembled panels. While the front and side panels preferably overly the upstanding flanges on the floor panel, the reverse could be utilized and still retain the double thickness overlapping feature of this invention. The wall thicknesses of the panels and their flanges are uniform and even so as to minimize differences in expansion and contraction of the panels due to temperature variations and, hence, minimize warping or distortion of the assembled liner.

After the front panel 14 and the side panels 16—16 have been secured to the floor panel 12, the assembled panels are placed in the bed of a truck 40 (see FIGS. 1 and 7). The rail guards 20—20 are positioned on the upper flanges 16c—16c of the side panels 16—16. Using a template 42, which desirably is furnished with the assembly 10, the center of each stake pocket 40c in the side wall of the truck bed 40 is marked on the upper surface of each of the rail guards 20—20. Three holes 20b are drilled through the rail guards 20—20 at the markings, and the guards are secured on the flanges 16c—16c of the side panels 16—16 and the side walls of the truck bed through the stake pocket openings 16d in the flanges and the stake pockets 40c in the truck bed with fastening means such as toggle bolts 44, and caplug washers 46 and caplugs 48 (see FIGS. 5, 6, and 15). This arrangement serves to rigidly secure the assembled panels of the liner 10 to the truck bed.

A molding 50, which desirably is made of a metal such as stainless steel and is furnished with the assembly, advantageously is installed along the rear margin of the main body portion 12a of the floor panel 12. As shown in FIG. 14, the rear leg 50a of the molding 50 is aligned with the rear margin of the truck bed floor 40a, and front leg 50b of the molding 50 is placed in overlying relation with respect to the rear edge of the portion 12a. Holes 50c are drilled through the leg 50a of the molding 50 into the truck bed floor 40a, and the molding 50 is secured in place by means of screws 52.

The tailgate panel 18 is next placed on the tailgate 40b with the upper flange 18a thereof overlying the top edge of the tailgate 40 while the tailgate is in its open position. Holes 18c are then drilled through the tailgate panel 18 and into the tailgate 40b (see FIG. 7), and the panel 18 is secured to the tailgate 40b with screws 54.

While the invention has been illustrated and described in relation to a specific embodiment thereof, it should be understood that various modifications may be made in the liner assembly without departing from the spirit and scope of the invention.

What is claimed is:

1. A knockdown protective liner assembly for the bed of a pickup truck including a bed floor, a bed front wall, bed side walls and a tail gate, said liner assembly consisting of interconnectible panels comprising: a floor panel for the bed floor and having upstanding flanges at the front and side edges thereof; a front panel for the bed front wall and for overlapping the upstanding flange at the front edge of the floor panel and having an upper outwardly extending flange for overlying the top of the bed front wall, a lower inwardly extending flange for overlapping the front portion of the floor panel, and inwardly extending end flanges; side panels for the bed side walls and for overlapping the upstanding flanges at the side edges of the floor panel and having upper outwardly extending flanges for overlying the tops of the bed side walls, lower inwardly extending flanges for overlapping the side portions of the floor panel and forward inwardly extending end flanges for overlapping the inwardly extending end flanges of the front panel; and fastening means for fastening the front panel to the upstanding flange at the front edge of the floor panel, the forward inwardly extending end flanges of the side panels to inwardly extending end flanges of the front panel and the side panels to the upstanding flanges at the side edges of the floor panel to form a unitary protective liner to be received in the bed of the pickup truck.

2. The protective liner assembly of claim 1 including a tailgate panel for the tailgate having an upper outwardly extending flange overlying the top of the tail gate, and securing means for securing the tail gate panel to the tail gate.

3. The protective liner assembly of claim 1 wherein the floor panel has a plurality of inwardly extending offset ribs to permit air circulation between the floor panel and bed floor to reduce condensation and rust, said offset ribs being diagonally arranged to facilitate movement of cargo on the floor panel.

4. The protective liner assembly of claim 1 wherein the front panel has an outwardly extending offset portion to add rigidity and strength to the front panel.

5. The protective liner assembly of claim 1 wherein the side panels have outwardly extending offset portions to add rigidity and strength to the side panels.

6. The protective liner assembly of claim 1 wherein the side panels have inwardly extending offset portions to add rigidity and strength to the side panels.

7. The protective liner assembly of claim 1 wherein the floor and bed side walls of the pickup truck have wheel wells, the floor panel accommodates the wheel wells and the side panels have inwardly extending offset portions accommodating the wheel wells.

8. A protective liner assembly for the bed of a pickup truck including a bed floor, a bed front wall, bed side walls and a tail gate, said liner assembly comprising, a floor panel for the bed floor and having upstanding flanges at the front and side edges thereof, a front panel for the bed front wall and for overlapping the upstanding flange at the front edge of the floor panel and having an upper outwardly extending flange for overlying the top of the bed front wall and a lower inwardly extending flange for overlapping the front portion of the floor panel, side panels for the bed side walls for overlapping the upstanding flanges at the side edges of the floor panel and having upper outwardly extending flanges for overlying the tops of the bed side walls, lower inwardly extending flanges for overlapping the side portions of the floor panel and forward inwardly extending flanges for overlapping the front panel, fastening means for fastening the front panel to the upstanding flange at the front edge of the floor panel, the forward inwardly extending flanges of the side panels to the front panel and the side panels to the upstanding flanges at the side edges of the floor panel to form a unitary protective liner to be received in the bed of the pickup truck, and rail guards for overlying the upper outwardly extending flanges of the side panels.

9. The protective liner assembly of claim 4 wherein the bed side walls have stake pockets, and including securing means extending through the rail guards and past the upper outwardly extending flanges of the side panels into the stake pockets for securing the unitary protective liner in the bed of the pickup truck.

10. A protective liner assembly for the bed of a pickup truck including a bed floor, a bed front wall, bed side walls and a tail gate, said liner assembly comprising, a floor panel for the bed floor and having upstanding flanges at the front and side edges thereof, a front panel for the bed front wall and for overlapping the upstanding flange at the front edge of the floor panel and having an upper outwardly extending flange for overlying the top of the bed front wall and a lower inwardly extending flange for overlapping the front portion of the floor panel, side panels for the bed side walls and for overlapping the upstanding flanges at the side edges of the floor panel and having upper outwardly extending flanges for overlying the tops of the bed side walls, lower inwardly extending flanges for overlapping the side portions of the floor panel and forward inwardly extending flanges for overlapping the front panel, fastening means for fastening the front panel to the upstanding flange at the front edge of the floor panel, the forward inwardly extending flanges of the side panels to the front panel and the side panel to the upstanding flanges at the side edges of the floor panel to form a unitary protective liner to be received in the bed of the pickup truck, and a floor molding strip for overlying the rear edge of the floor panel.

11. The protective liner assembly of claim 6 including securing means for securing the floor molding strip to the bed floor.

* * * * *